Dec. 30, 1941.   H. E. SOMES   2,268,528
METHOD OF PRODUCING HARDENED VALVE SEATS
Original Filed April 21, 1930   2 Sheets-Sheet 1
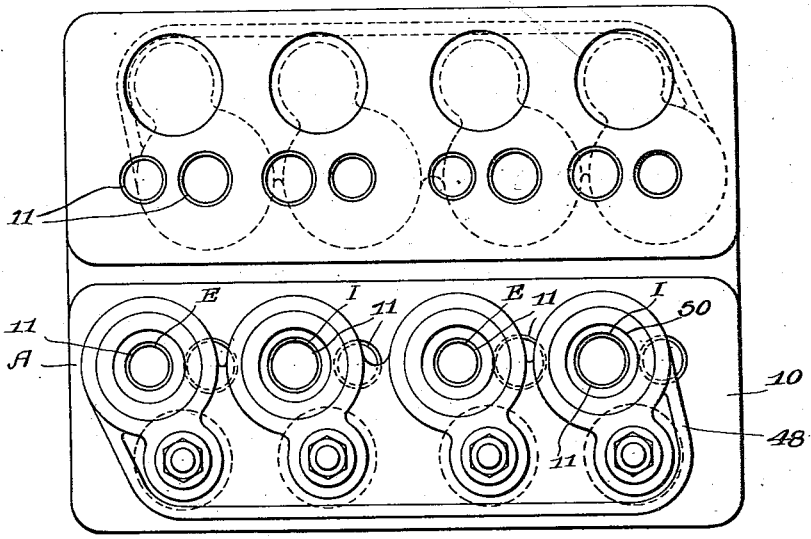
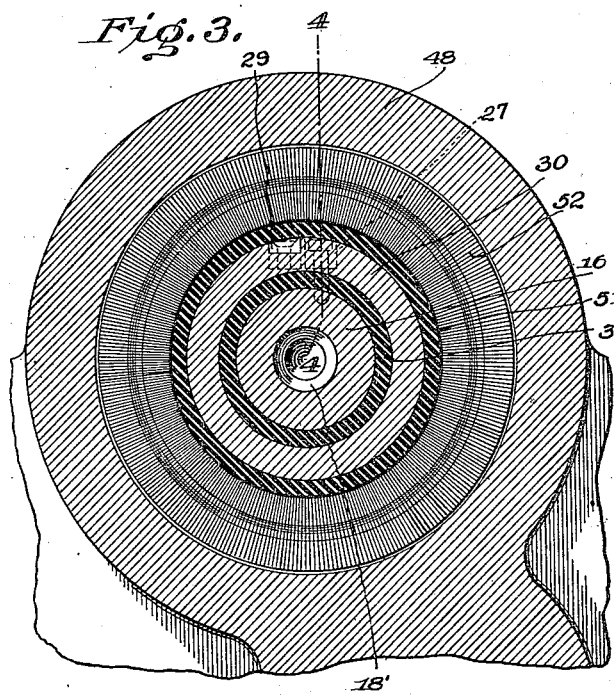
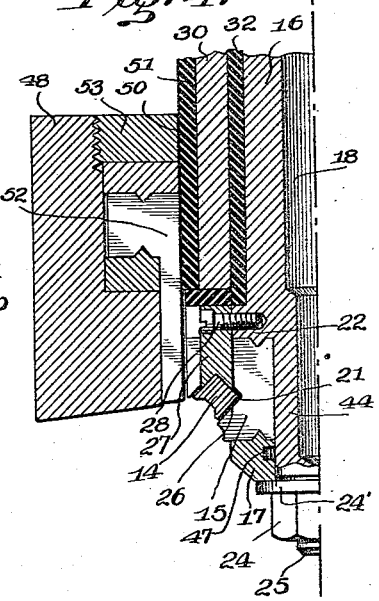
Inventor
Howard E. Somes
By
Attorney Dec. 30, 1941.  H. E. SOMES  2,268,528
METHOD OF PRODUCING HARDENED VALVE SEATS
Original Filed April 21, 1930  2 Sheets-Sheet 2
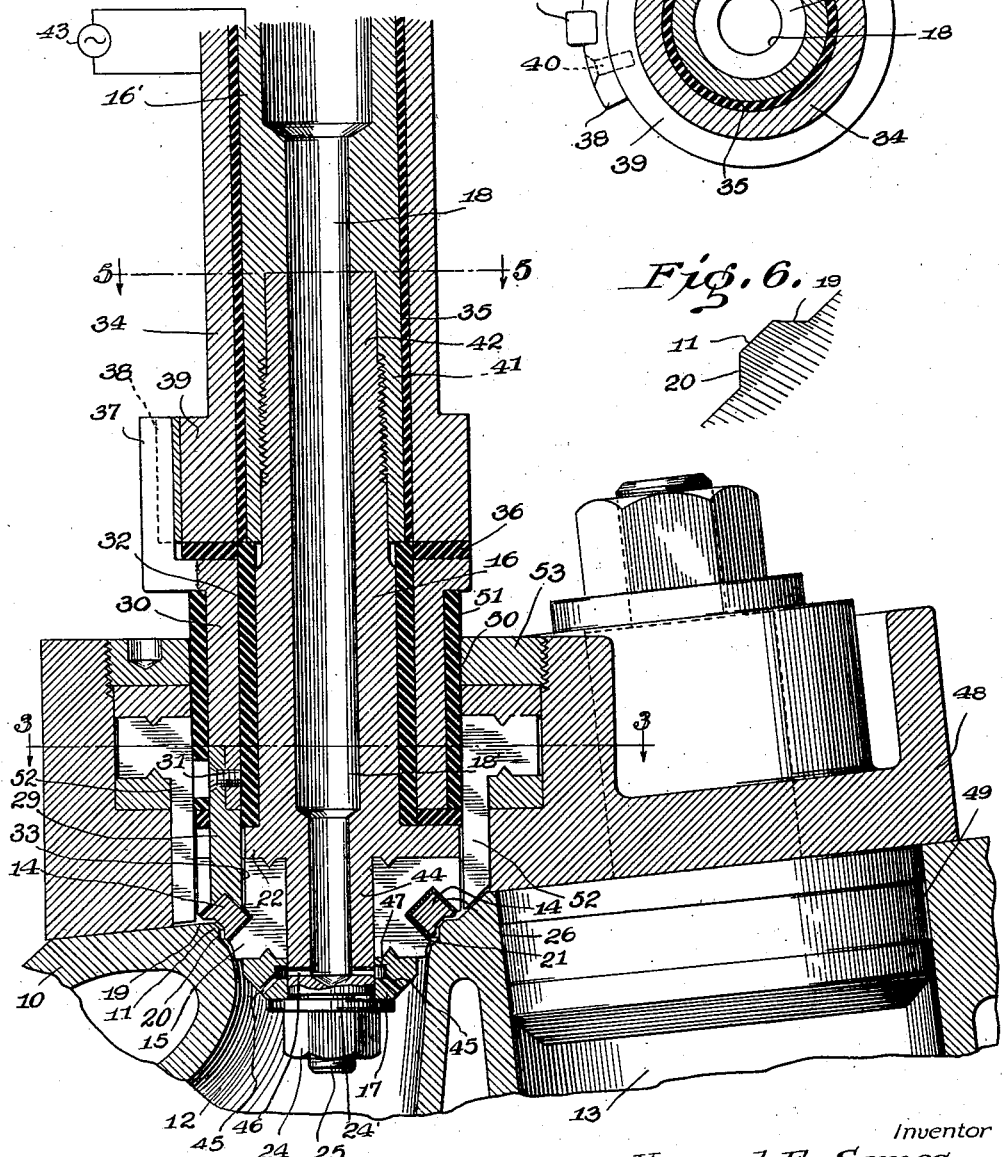
Inventor
Howard E. Somes
By
Attorney Patented Dec. 30, 1941

2,268,528

UNITED STATES PATENT OFFICE 2,268,528

METHOD OF PRODUCING HARDENED VALVE SEATS

Howard E. Somes, Detroit, Mich., assignor to Budd Induction Heating, Inc., Philadelphia, Pa., a corporation of Michigan Original application April 21, 1938, Serial No. 203,277. Divided and this application May 22, 1939, Serial No. 274,959

1 Claim. (Cl. 148—21)

The present invention relates in general to electrical heat treatment of metallic articles and more particularly to differential heat treatment by electromagnetic induction of an integral portion of an object for the purpose of hardening such portion, and is a division of my copending application Serial No. 203,277 filed April 21, 1938, for Electrical heat treating apparatus.

The main object of the invention is the provision of a method for hardening by electro-magnetic induction, a conical valve seat or similar portion formed integrally with an article of metal hardenable by heat treatment, for example, the cylinder block of an internal combustion engine.

In attempting the hardening of a conical valve seat of an internal combustion engine by electromagnetic induction, including a heating step followed immediately by quenching, certain difficulties arise due to the peculiar shape and angular position of the portion operated upon, and space limitations, not encountered in similar operations upon objects of more favorable form and larger dimensions.

Chief among such problems are: the controlling of the position and form of the hardened zone with relation to the angularly disposed valve seat surface; the concentration of sufficient energy, in the space available, to do the work with the rapidity necessary to obtain the results desired; the attainment of rapid and uniform quenching within an extremely short time after heating; and the attainment of simplicity and strength with compactness in the apparatus.

Another problem is to overcome difficulties arising from the fact that the space available below the valve seat for reception of portions of the apparatus extending below the valve seat, is limited to the relatively small diameter valve duct or channel below the seat.

It is, therefore, an important object of the invention to provide a method whereby a hardened zone of the desired quality may be produced near and including the conical valve seat surface and adjacent portions of adjoining surfaces extending away from the valve seat surface at an angle thereto, and to achieve such result with a valve seat of small diameter for example in the neighborhood of two inches or less and situated over a duct of substantially smaller diameter than the valve seat.

Various other objects and advantages of the invention will become apparent from a perusal of the following specification and the drawings accompanying the same.

In the drawings:

Fig. 1 is a diagrammatic plan view of a V-type multicylinder engine block with the top portions shown in a horizontal plane;

Fig. 2 is a vertical axial section through the heating element and the valve seat and cylinder bore of an engine block;

Fig. 3 is a section on the line 3—3 of Fig. 2;

Fig. 4 is a section on the line 4—4 of Fig. 3;

Fig. 5 is a section through the tool shaft and conducting sleeve taken on the line 5—5 of Fig. 2; and Fig. 6 is an enlarged fragmentary radial section through a hardened valve seat portion of an engine block.

Referring to the drawings in detail, the object operated upon is here shown as the engine block 10 of a multi-cylinder internal combustion engine having a conical valve seat portion 11 formed about the upper opening of the valve duct or channel 12 adjacent a cylinder bore 13, which valve seat portion is to be hardened or provided with a hardened zone near and including the valve seat surface 11. The induction heating element or tool is comprised in general of the inducing conductor 14 looped in a single annulus provided with a magnetic core element 15 and carried at the lower end of the tool frame 16 separably secured to a tool shaft 16′ for movement into and out of operative relation with the valve seat as well as for rotary movement with relation to the valve seat, the lowermost end of the tool frame carrying a quenching nozzle 17 below the inducing conductor and in fluid connection with a fluid conducting channel 18 extending through the tool frame and continuous with the channel 18′ in the tool shaft. While no special means for effecting vertical and rotational movement of the tool shaft is shown herein, it is understood that any known or other suitable means for imparting a vertical and rotational movement to the shaft may be used, for example, such as is shown in my copending application Serial No. 164,320, filed September 17, 1937.

The inducing conductor 14 is of general rectangular cross section arranged in an annular loop coaxial with the axis of the tool shaft and set with its rectangular cross sectional contour at an angle so that its lower, outer annular face may be brought into parallelism with the face of the valve seat. The lower outer portion of the inducing conductor 14 is also provided with annular projecting portions along its edges forming an annular recess having surfaces arranged to lie substantially parallel to and in substantially equally close proximity to both the valve seat surface 11 and the adjacent surfaces 19 and 20 for a substantial distance from the edges of the valve seat. Similarly the angular magnetic core element 15 is formed with an annular recess 21 facing outwardly and downwardly to receive the inducing conductor 14 and also the valve seat surface for an appreciable depth. Thus both the inducing conductor 14 and its magnetic core element 15 are arranged to partially embrace the valve seat portion and to receive the valve seat surface for an appreciable depth. The core element 15 is built up preferably of a series of tapered radially arranged laminations to form a compact mass of radially laminated material, the laminations being clamped in position near the lower end of the tool frame 16 between the clamping shoulder 22 and the top portion of the quenching nozzle 17 which latter is fitted over a reduced lower extension of the tool frame in clamping relation with the laminated core element 15 by means of a clamping nut 24 threaded onto the thread extension 25 at the lower extremity of the tool frame.

An insulation lining 26 suitably insulates the conductor 14 from the core element 15, the conductor 14 having one terminal grounded or connected to frame through a terminal extension 27 (Fig. 4) which connects with the tool frame 16 through means of a binding screw 28. The other terminal of the conductor loop is connected through a terminal extension 29 (Figures 2 and 5) to a conducting sleeve extension 30 through a binding screw 31, the sleeve extension 30 being insulated from the tool frame 16 by means of an insulating bushing or sleeve 32. Insulation of the terminal extension 29 from the core element 15 may be effected by means of the air gap 33 as shown or by other suitable insulating material inserted between the extension 29 and the core element. Electrical connection is extended from the sleeve extension 30 up along the tool shaft 16' by means of the conducting sleeve 34 surrounding the tool shaft and insulated therefrom by the insulating sleeve 35 and washer 36. Electrical contact is established between the sleeve extension 30 and conducting sleeve 34 through a separable electrical connection comprising the conducting bar 37 secured to the sleeve extension 30 as by welding or brazing, and extending up around the insulating washer 36 into sliding contact with an axially extending groove in the arc shaped lug 38 secured to the shoulder 39 on the conducting sleeve by a screw 40. The tool shaft 16 is also rendered separable in the vicinity of the shoulder 39 by means of the complementary threaded sections 41 and 42 so that the heating tool per se may be separated from the tool shaft and conducting sleeve 34 by simply removing the screw 40 permitting relative rotation between the tool shaft 16' and the heating element with resultant separation of the complementary threaded portions 41, 42.

With the heating tool or element constructed as above described, high frequency energizing current may be supplied to the inducing conductor 14 by way of the tool shaft 16 and conducting sleeve 34 as current leads over a path which may be traced from the tool shaft 16', tool frame 16, terminal extension 27 (Figure 4), inducing conductor 14, terminal extension 29 (Figure 2), sleeve extension 30, conducting bar 37 and arc shaped contact element 38 to the shoulder element 39 and conducting sleeve 34. Thus the heating element may be readily supplied with energizing current from a suitable source of high frequency current as indicated diagrammatically at 43 through leads connected to the concentric shaft and sleeve arrangement 16'—34 in any known or other suitable manner as through a sliding contact arrangement, such for example as that shown in my copending application above referred to.

The quenching nozzle 17 is in the form of an annulus fitted around the lower, reduced extension 44 of the tool frame 16 with a snug fit and held thereon in clamping relation against the laminations of the core element 15 by the clamping nut 24 through the pressure washer 24'. It is provided with a series of spray orifices 45 connected through an annular manifold duct 47 with the radial ducts 46 extending inwardly into communication with the central channel 18 in the tool frame 16. The quenching nozzle 17 may thus be supplied with a suitable quenching fluid from a source not shown, through the channel 18' of the tool frame 16. By forming the spray nozzle as shown with outwardly directed orifices, it may be made much smaller in diameter than the diameter of the valve seat to enable it to project into the relatively small diameter valve duct or channel 12 below the valve seat when the inducing conductor 14 is in operative relation with the valve seat.

To insure proper alignment of the heating tool with the valve seat in its movement to and from the valve seat, and in its rotary movement with relation to the valve seat, a supplemental guide fixture 48 is provided which, for the treatment of a multi-cylinder engine block as here shown, is arranged to fit over the top of one half of the V-type block and is provided with a plurality of piston-like dowel elements 49 for holding the guide fixture in place on the engine block in predetermined position relative to the cylinder bores and valve seats. The guide seat fixture 48 is provided with a plurality of guide openings 50 arranged to align with certain of the valve seats, in the present case alternate valve seats to permit the use of heating tools of diameters greater than the center-to-center spacing between adjacent valve seats. To maintain the conducting sleeve extension 30 of the tool insulated from the guide fixture during its sliding and rotational movement within the guide opening 50, such extension is provided with an insulating covering or bushing 51 which also acts as a bearing sleeve between the heating tool and the inner surface of the guide opening. To extend the flux generated in the core element 15 radially outwardly beyond the valve seat and to an appreciable depth below the valve seat surface, and to shield the guide fixture 48 in the vicinity of the guide opening from the flux, a radially laminated lining sleeve 52 of appreciable radial depth is inserted in the guide element so as to extend downwardly between the guide element and the radially outermost face of the core element to near the outer edge of the valve seat. The magnetic lining 52 like the core element 15 is built up of a compact series of radially tapered laminations arranged as indicated in Fig. 3 to form a compact mass of radially laminated material, the laminations being extended radially outwardly at their upper ends to permit their being clamped in position within the guide opening between suitable upper and lower clamping rings held in position by the clamping ring nut 53.

For the treatment of an eight cylinder V-type engine block as here indicated, it is preferable to use the heating tools in groups of 4, spaced so as to align with alternate valve seats. The guide fixture 48 is, therefore, provided with a group of four guide openings 50 arranged to align with alternate valve seats, for use as guides for the group of four heating tools. For the intermediate, alternate valve seats not provided for by the guide fixture 50 shown in position at the lower half of Fig. 1, a second guide fixture similar to the one shown but formed as a mirrored image thereof is provided, having guide openings registering with the said intermediate alternate valve seats. The guide fixture as shown in dotted lines at the top of Fig. 1 is the same as that shown at the bottom of Fig. 1 except that it is turned around in the plane of the drawings.

It is to be noted that while the magnetic lining element 52 is shown as extending a considerable distance upwardly from the inducing conductor 14 such an extension is not necessary from an electrical standpoint but is used as a constructional expedient to provide for the mounting of the laminations; in fact it is possible to do away with the lining element 52 altogether, replacing it by a further radial extension of the core element 15 to carry it radially over the outermost edge of the valve seat and between the inducing conductor and the guide fixture, it being understood that the insulation sleeve or bushing 51 and guide opening 50 would be increased to a diameter at least equal to that of the extended core element. Inasmuch as the second group of alternate valve seats would run in a different order from the first group, that is instead of running in the order of exhaust, inlet, etc., as indicated by the initials E, I, etc., respectively, at the bottom of Fig. 1, would run in the order of inlet, exhaust, etc., it would be necessary to provide two groups of heating tools arranged in opposite order. On the other hand, it will be obvious that by suitable relative lateral movement between the engine block and the heating tool, a single heating tool may be used. In either case, the heating tool or tools would be suitably arranged for lateral and rotary movement as well as for the supply of electrical energy and quenching fluid in a manner similar to that shown and described in my copending application Serial No. 164,320, filed September 17, 1937.

In operation with the guide fixture in position as shown in the drawings, the tool shaft 16 is moved downwardly to slide the heating tool assemblage into the guide opening 50 and into the position shown in Fig. 2 with the inducing conductor 14 parallel to and in close proximity to the surface of the valve seat 11, and the quenching nozzle 24 extended down into the valve duct 12 below the valve seat. Upon assumption of this, the operative position of the heating tool, energizing current is supplied to the inducing conductor 14 from the source 43 through the tool shaft 16 and conducting sleeve 18 over a path previously traced, the connection with the source 43 including any known or other suitable switching and control system which for example may be similar to that shown in my copending application Serial No. 96,346, filed August 7, 1936. Energization of the inducing conductor loop 14, due to the peculiar shape and arrangement of the conductor 14 and the core element 15 and their position in relation to the valve seat, causes annular heating currents to be induced in a zone near and including the valve surface and the adjacent portions of the adjoining surfaces extending away from the valve surface, thus heating that portion of the cylinder block which constitutes the valve seat and adjacent portions. During this heating operation, the heating tool is rotated relative to that valve seat so as to offset any unevenness in the heated zone due to lack of absolute symmetry of the annular loop portion of the inducing conductor resulting from the presence of the terminal connections at one side of the loop.

Upon attainment of the proper hardening temperature, the current supply to the inducing conductor is discontinued and the heating tool together with the quenching nozzle 23 is raised to bring the nozzle above the level of the valve seat to a position where quenching fluid, for example, water, flowing from the spraying jets will be directed against the valve seat to quench the same, the quenching fluid being at this time supplied through the channel 18 in the tool shaft. The time and duration of application of quenching fluid, as well as the time and duration of application of energizing current to the inducing conductor, may be controlled by any known or other suitable timed controlling device not shown, and which for example may be similar to that shown in my copending application last above referred to. At the end of the quenching period the tool shaft 16 is raised further to carry the heating tool and spray nozzle upwardly clear of the guide fixture, to permit replacement of the guide fixture, removal of the engine block or displacement of the engine block with respect to the tool element as required, and according as to whether a single heating tool is used for several valve seats of like diameter, or a group of several heating tools.

Where a single heating tool is used for the several valve seats of like diameter, there will, of course, be required two such tools because of the difference in size between the exhaust valve and the intake valve.

While, in Fig. 6, I have shown the hardened zone as of a particular contour by way of example and for the sake of illustration, it is to be understood that such zone may not assume the particular contour shown but may vary therefrom appreciably, without departure from the desired result, that of obtaining a hardened zone near and including the valve seat surface and parts adjacent thereto.

While I have herein shown and described a specific embodiment of my invention for the sake of disclosure, it is to be understood that the invention is not limited to such specific embodiment but contemplates all such modifications and variants thereof as fall fairly within the scope of the appended claim.

The apparatus herein disclosed is claimed in the copending application Ser. No. 203,277, filed April 21, 1938, for Electrical heat treating apparatus, renewed January 18, 1941.

What I claim is:

A method of heating a surface of revolution in a workpiece when such surface is inclined to its axis, which method includes heating by electromagnetic induction only the radial and axial area to be hardened on said surface of revolution, holding a quenching nozzle in readiness to quench said area to be hardened with said nozzle located between an inducing conductor for heating the adjacent area and the apex of the inclined surface of revolution but adjacent said inducing conductor, breaking the electric supply circuit through said inducing conductor and simultaneously axially shifting the inducing conductor and the quenching nozzle away from said heated area until the quenching nozzle is in a position to direct a stream of quenching fluid onto said area.

HOWARD E. SOMES.